A. J. SCHULTZ.
EXPANSIBLE ATTACHING MEANS FOR CONNECTING TUBULAR ELEMENTS.
APPLICATION FILED AUG. 13, 1921.
1,422,227. Patented July 11, 1922.
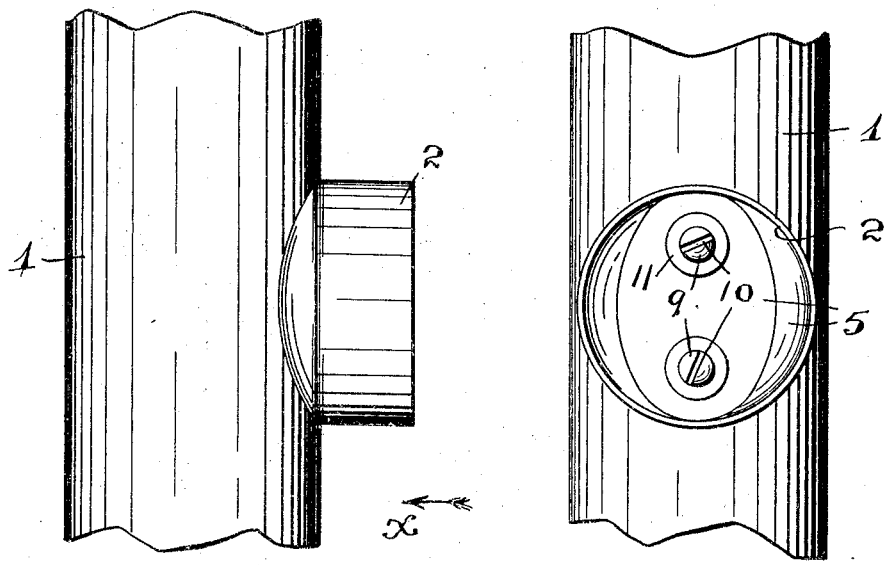
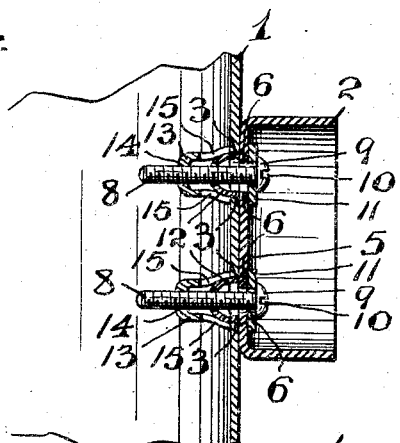
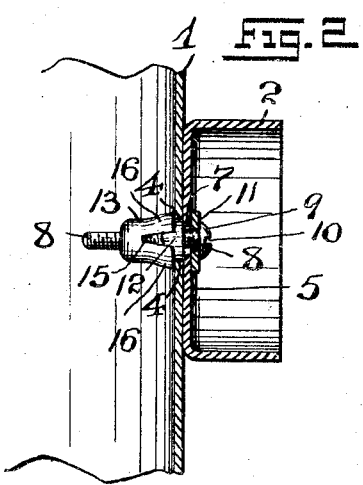
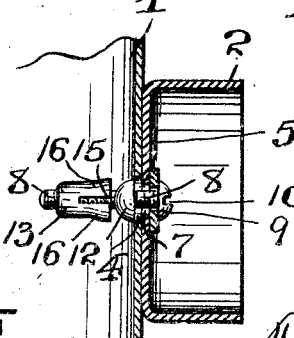
INVENTOR:
Abraham J. Schultz,
BY
Fraentzel and Richards
ATTORNEYS.

UNITED STATES PATENT OFFICE.

ABRAHAM J. SCHULTZ, OF NEWARK, NEW JERSEY.

EXPANSIBLE ATTACHING MEANS FOR CONNECTING TUBULAR ELEMENTS.

1,422,227.	Specification of Letters Patent.	Patented July 11, 1922.

Application filed August 13, 1921. Serial No. 492,074.

*To all whom it may concern:*

Be it known that I, ABRAHAM J. SCHULTZ, a citizen of the United States, residing at Newark, in the county of Essex and State of New Jersey, have invented certain new and useful Improvements in Expansible Attaching Means for Connecting Tubular Elements; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to a novel means for securing together tubular members, such as are used in the construction of metallic bed-steads; and, the present invention relates, more particularly, to a novel means of attachment for securing the usual tube-receiving caps, rod-ends or ferrules to a main tubular member or post, dispensing with the use of solder, or with the use of a single fastening screw upon which the tube-receiving cup is screwed.

In the construction of metallic bedsteads, as heretofore made, the usual tube-receiving end-members, in the form of caps or ferrules, are secured to the sides of the main tubular posts by means of solder or welding, or by the insertion of a screw-bolt from within the main tubular post, through a hole in the side of the post, then mounting the perforated end of the tube-receiving cup upon the projecting shank-portion of the screw-bolt and by means of a nut or grommet securing the parts in their assembled relation.

The difficulty with the above mentioned method of securing the various parts is that they often become loosened, so as to make a poor and a shaky connection of the tubular elements, and in which case there is no way of taking up on the loosened parts.

The principal object of the present invention is to provide a novel and simply-constructed single or double-contact fastening or securing means for the attachment of a tube-receiving cap, rod-end, or ferrule to the side of a main tubular element or post, with a view of providing a simply constructed means for easily and positively securing the tube-receiving cap to the side of the main tubular element, and at the same time providing a means which will positively prevent any turning and consequent loosening of the tube-receiving cap upon the main tubular element or post.

Other objects of the present invention not at this time more particularly enumerated will be clearly understood from the following detailed description of the present invention.

With the various objects of the present invention in view, the said invention consists, primarily, in the novel means for attaching a tube-receiving cap or ferrule to the side of a main tubular element or post hereinafter more fully set forth; and, the said invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is illustrated in the accompanying drawings, in which:—

Figure 1 is a front elevation of a fragmentary portion of a tubular element or post, such as is usually employed in the construction of metal bedstead frames, provided with a tube-receiving cap or ferrule attached to said tubular element or post according to the principles of the present invention; and Figure 2 is a view of the assembled parts shown in said Figure 1, and looking in the direction of the arrow $x$ in said last mentioned figure.

Figure 3 is a vertical sectional representation of the assembled elements represented in said Figures 1 and 2, said view showing in connection therewith, also in section, one arrangement of a fastening means, made according to and embodying the principles of the present invention, said view illustrating a double-contact fastening or securing means.

Figure 4 is a view, similar to Figure 3, of a portion of a tubular element or post and a tube-receiving cap or ferrule, said view illustrating in connection therewith, an arrangement of a single-contact fastening or securing means; and Figure 5 is a view, similar to Figure 4, of the several elements and the parts thereof in an assembled relation, prior to being permanently secured together.

Similar characters of reference are employed in all of the said above described views, to indicate corresponding parts.

Referring now to the several figures of the drawings, the reference-character 1 indicates a fragmentary portion of a main tubular element or post, such as is used in the construction of metal bedsteads, and to which is attached, by means of a fastening or attaching means, to be presently more fully described, a tube-receiving cap or ferrule 2.

In practice, the said tubular element or post 1 is usually made with a pair of perforations or holes 3, as indicated in Figure 3 of the drawings, although the said tubular element or post 1 may be provided with but a single perforation or hole, as 4, as indicated in Figure 4 of the drawings. The cap or ferrule 2, as will be seen from an inspection of said Figure 3, is likewise provided in its closed end 5 with a pair of holes or perforations 6, while the cap or ferrule 2, as shown in said Figure 4, is provided with but a single hole or perforation, as 7, the said holes or perforations in the cap or ferrule being made smaller than the corresponding holes in the main element or post 1, and said holes or perforations 6 being adapted to be brought into registration with the holes or perforations 3, and the hole or perforation 7 being adapted to be brought into registration with the hole or perforation 4.

The fastening or securing means for attaching the tube-receiving cap or ferrule 2 to the tubular element or post 1 in each instance is of the same construction, and the same consists, essentially, of a screw 8 provided with a suitably formed head or enlargement 9 which is slotted, as at 10, for the reception of the end of a screw-driver, although the said head or enlargement 9 may be otherwise made, for the reception of other forms of means for turning the screw.

Mounted upon the screw-threaded shank of the screw is a perforated disc or washer 11, a spreader-element 12, and an expansion element 13. This latter element is usually made bell-shape, being provided at its one end with a screw-threaded hole or perforation 14 for screwing the same upon the screw-threaded shank of the screw 8, and extending towards its other end, the said element 13 is made with a series of longitudinally extending slits 15, to provide a plurality of expansion-wings 16. The hereinabove mentioned spreader-element 12 is loosely mounted upon the shank of the screw 8, between the washer or disc 11 and the expansion-element 13, and is also preferably made cup-shaped, so as to present its curved or tapering surface toward the expansion wings or fingers 16 of the expansion-element 13.

To bring the various devices and parts into their assembled relation, the disc or washer 11 is first placed upon the shank of the screw 8, and against the head or enlargement 9 of said screw. The shank-portion of the screw is then passed into the chambered part of the cap or ferrule 2, and through the hole or perforation in the end-wall of the cap or ferrule, until the disc or washer rests directly upon the inner surface of the said end-wall. The spreader-element 12 is thereupon passed over the free end of the shank of the screw 8, until it rests upon the marginal portions of the hole or holes in the end-wall 5 of the said cap or ferrule 2. The expansion element 13 is now also screwed down upon the screw-threader shank of the screw 8, until its expansion wings or fingers 16 sufficiently engage the cone-shaped or taper-surface of the spreader-element 12, to maintain the several elements in a fixed relation to the said cap or ferrule 2, as will be evident. When thus arranged, the screw-threaded shank with the bell-shaped expansion-element 13 in proper position thereon, are then passed through a hole or perforation in the tubular element or post 1, the expansion wings or fingers 16 contracting sufficiently to permit passing through the hole or perforation in the tubular element or post, and immediately after passing the hole or perforation, spreading sufficiently so as to frictionally engage the inner marginal surface-portions bounding the hole or perforation in the tubular element or post 1, as will be clearly understood from an inspection of Figures 3 and 4 of the drawings. Next, by tightening up the screw 8, the expansion-wings or fingers 16 are forced against the rounded or tapered surface of the spreader-element 12, the latter being fixed against the end-wall 5 of the said cap or ferrule 2, whereby the said expansion-wings or fingers 16 are still further spread apart, and caused to positively grip the inner surface of the said main tubular element or post 1, and whereby the various parts are securely held in their assembled relations, against any accidental displacement, as will be clearly understood.

While my novel fastening means herein described is admirably adapted for use in the manufacture of the frames for metal bedsteads, it will be understood that the said fastening or securing means may also be put to other uses, where it is desirable to attach a tube or rod-receiving cap or ferrule to a tubular element or post.

Of course, I am aware that changes may be made in the general arrangements and combinations of the several devices and parts, as well as in the details of the construction of the same, without departing from the scope of the present invention as set forth in the foregoing specification, and as defined in the clauses of the claims which are appended thereto. Hence, I do not limit my present invention to the exact arrangements and combinations of the several devices and parts as described in the said specification, nor do I confine myself to the exact details of the construction of the said parts, as shown in the accompanying drawings.

I claim:—

1. In an attachment of the character set forth, in combination with a main tubular element provided with a perforation, a receiving-cap or ferrule adapted to be attached to said tubular element, said cap or ferrule being also provided with a perforation, a tightening bolt extending through said perforations, and an expansion-element mounted upon said bolt and adapted to be tightened against the inner surface of said main tubular element when the said bolt is actuated.

2. In an attachment of the character set forth, in combination with a main tubular element provided with a perforation, a receiving-cap or ferrule adapted to be attached to said tubular element, said cap or ferrule being also provided with a perforation, a tightening bolt extending through said perforations, and a cone-shaped spreader-element mounted upon said bolt, and an expansion-element also mounted upon said bolt with which the said spreader-element is adapted to be brought in engagement for tightening said expansion-element against the inner surface of said main tubular element when the said bolt is actuated.

3. In an attachment of the character set forth, in combination with a main tubular element provided with a perforation, a receiving-cap or ferrule adapted to be attached to said tubular element, said cap or ferrule being also provided with a perforation, a tightening bolt extending through said perforations, a bell-shaped expansion-element screwed upon said bolt, said bell-shaped expansion-element being provided with longitudinally extending slits and intermediately disposed expansion-wings, and means connected with said bolt adapted to be brought in engagement with said wings for spreading the same and tightening said expansion-element against the inner surface of said main tubular element when the bolt is actuated.

4. In an attachment of the character set forth, in combination with a main tubular element provided with a perforation, a receiving-cap or ferrule adapted to be attached to said tubular element, said cap or ferrule being also provided with a perforation, a tightening bolt extending through said perforations, a cone-shaped spreader-element mounted upon said bolt, the cone-shaped surface of which is adapted to be brought in engagement with said wings for spreading the same and tightening said expansion element against the inner surface of said main tubular element when the bolt is actuated.

5. In an attachment of the character set forth, in combination with a main tubular element provided with a perforation, a receiving-cap or ferrule comprising a perforated end-wall adapted to be placed against the perforated surface-portion of said main tubular element, a tightening screw extending through said perforated end-wall of the cap or ferrule and through the perforation in said main tubular element, said screw being provided within said cap or ferrule with an actuating head, a washer upon said screw between said head and the inner surface of the end-wall of said cap or ferrule, a bell-shaped expansion-element screwed upon said screw, said bell-shaped expansion-element being provided with longitudinally extending slits and intermediately disposed expansion-wings, and a cone-shaped spreader-element mounted upon said bolt and bearing upon the end-wall of said cap or ferrule, the cone-shaped surface of said spreader-element being adapted to be brought in engagement with the wings of said expansion-element for spreading the same and tightening said expansion-element against the inner surface of said main tubular element when the screw is actuated.

In testimony that I claim the invention set forth above I have hereunto set my hand this 11th day of August, 1921.

ABRAHAM J. SCHULTZ.

Witnesses:
FRED'K C. FRAENTZEL,
DORA WALZ.